(12) United States Patent
Hsieh et al.

(10) Patent No.: US 8,027,689 B2
(45) Date of Patent: Sep. 27, 2011

(54) METHOD, WIRELESS COMMUNICATION SYSTEM, TANGIBLE MACHINE-READABLE MEDIUM, AND COMMUNICATION APPARATUS FOR TRANSMITTING BANDWIDTH ALLOCATION BASED ON A MULTI-HOP RELAY STANDARD

(75) Inventors: Chih-Chiang Hsieh, Jen-Wu Township, Kaohsiung County (TW); Shiann-Tsong Sheu, Taipei (TW); Hua-Chiang Yin, Guei-Shan Township, Taoyuan County (TW); Youn-Tai Lee, Yung-Ho (TW); Kan-chei Loa, Taipei (TW); Yung-Ting Lee, Taipei (TW); Yi-Hsueh Tsai, Taipei County (TW); Frank Chee-Da Tsai, Taipei (TW); Heng-Iang Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 870 days.

(21) Appl. No.: 11/951,129

(22) Filed: Dec. 5, 2007

(65) Prior Publication Data

US 2008/0214105 A1    Sep. 4, 2008

Related U.S. Application Data

(60) Provisional application No. 60/892,724, filed on Mar. 2, 2007.

(51) Int. Cl.
 *H04Q 7/22* (2006.01)
(52) U.S. Cl. ........... 455/452.2; 455/509; 455/458; 455/515
(58) Field of Classification Search ......... 455/450, 455/452.1, 452.2, 454, 455, 458, 464, 509, 455/515, 517; 370/337, 442, 335
 See application file for complete search history.

(56) References Cited

U.S. PATENT DOCUMENTS

| 5,982,761 | A * | 11/1999 | Dutta | 370/337 |
| 6,459,703 | B1 * | 10/2002 | Grimwood et al. | 370/442 |
| 2007/0274265 | A1 * | 11/2007 | Yoon et al. | 370/335 |

* cited by examiner

*Primary Examiner* — John J Lee
(74) *Attorney, Agent, or Firm* — Patterson Thuente Christensen Pedersen, P.A.

(57) ABSTRACT

A method, a wireless communication system, a tangible machine-readable medium, and a communication apparatus for transmitting a bandwidth (BW) allocation based on a multi-hop relay standard are provided. The wireless communication system comprises a BS and at least one RS. The BS transmits the at least one particular channel descriptor to the at least one RS. The least one RS transmits at least one Ack to the BS for replying the at least one particular channel descriptor. Finally, the BS transmits the at least one BW allocation to the at least one RS according to the at least one Ack in a predetermined interval.

14 Claims, 6 Drawing Sheets

METHOD, WIRELESS COMMUNICATION SYSTEM, TANGIBLE MACHINE-READABLE MEDIUM, AND COMMUNICATION APPARATUS FOR TRANSMITTING BANDWIDTH ALLOCATION BASED ON A MULTI-HOP RELAY STANDARD

CROSS-REFERENCES TO RELATED APPLICATIONS

This application claims the benefit of Provisional Application Ser. No. 60/892,724 filed on Mar. 2, 2007.

BACKGROUND OF THE INVENTION

1. Field of the Invention

The present invention relates to a method, a wireless communication system, a tangible machine-readable medium, and a communication apparatus for transmitting a bandwidth (BW) allocation based on a multi-hop relay standard; more specifically, relates to a method, a wireless communication system, a tangible machine-readable medium, and a communication apparatus for transmitting a BW allocation according to a channel descriptor based on a multi-hop relay standard.

2. Descriptions of the Related Art

Although IEEE 802.16 standard already provides greater bandwidths, lower building cost, better service quality and expansibility, there still exist some defects of coverage and signal quality of IEEE 802.16 standard. Therefore, IEEE 802.16j standard working group established a multi-hop relay study group in July 2005 for building a multi-hop relay standard.

When a relay station (RS) of IEEE 802.16 standard transmits a channel descriptor, such as a downlink channel descriptor (DCD) or an uplink channel descriptor (UCD), a BW allocation configured by a base station (BS) is needed. Accordingly, a solution to configure BW allocations for mobile stations (MSs)/subscriber stations (SSs) and relay stations (RSs) based on a multi-hop relay standard, such as IEEE 802.16j standard, is desired.

SUMMARY OF THE INVENTION

One objective of this invention is to provide a method for transmitting at least one bandwidth (BW) allocation according to at least one particular channel descriptor divided from a channel descriptor based on a multi-hop relay standard. The method comprises the following steps: transmitting the at least one particular channel descriptor from a BS to at least one RS; transmitting at least one acknowledgement character (Ack) from the at least one RS to the BS for replying the at least one particular channel descriptor; and transmitting the at least one BW allocation from the BS to the at least one RS according to the at least one Ack in a predetermined interval.

Another objective of this invention is to provide a wireless communication system for transmitting at least one BW allocation according to at least one particular channel descriptor divided from a channel descriptor based on a multi-hop relay standard. The wireless communication system comprises a BS and at least one RS. The BS transmits the at least one particular channel descriptor to the at least one RS. The least one RS transmits at least one Ack to the BS for replying the at least one particular channel descriptor. Finally, the BS transmits the at least one BW allocation to the at least one RS according to the at least one Ack in a predetermined interval.

Another objective of this invention is to provide a tangible machine-readable medium having executable code to cause a machine to perform a method for transmitting at least one BW allocation according to at least one particular channel descriptor divided from a channel descriptor based on a multi-hop relay standard. The method comprises the following steps: transmitting the at least one particular channel descriptor from a BS to at least one RS; transmitting at least one Ack from the at least one RS to the BS for replying the at least one particular channel descriptor; and transmitting the at least one BW allocation from the BS to the at least one RS according to the at least one Ack in a predetermined interval.

Another objective of this invention is to provide a communication apparatus for transmitting at least one BW allocation based on a multi-hop relay standard. The communication apparatus comprises a transmitting module and a receiving module. The transmitting module transmits at least one particular channel descriptor divided from a channel descriptor to at least one RS. The receiving module receives at least one Ack from the at least one RS for replying the at least one particular channel descriptor Finally, the transmitting module transmits the at least one BW allocation to the at least one RS according to the at least one Ack in a predetermined interval.

The aforesaid method can be executed by wireless communication apparatus, such as a BS in the wireless communication system. By transmitting the particular channel descriptors to each RSs of the wireless communication system and receiving Acks from each RS which has received one of the particular channel descriptors, this invention can transmit BW allocations to each RS of the wireless communication system based on a multi-hop relay standard for channel descriptor transmission.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
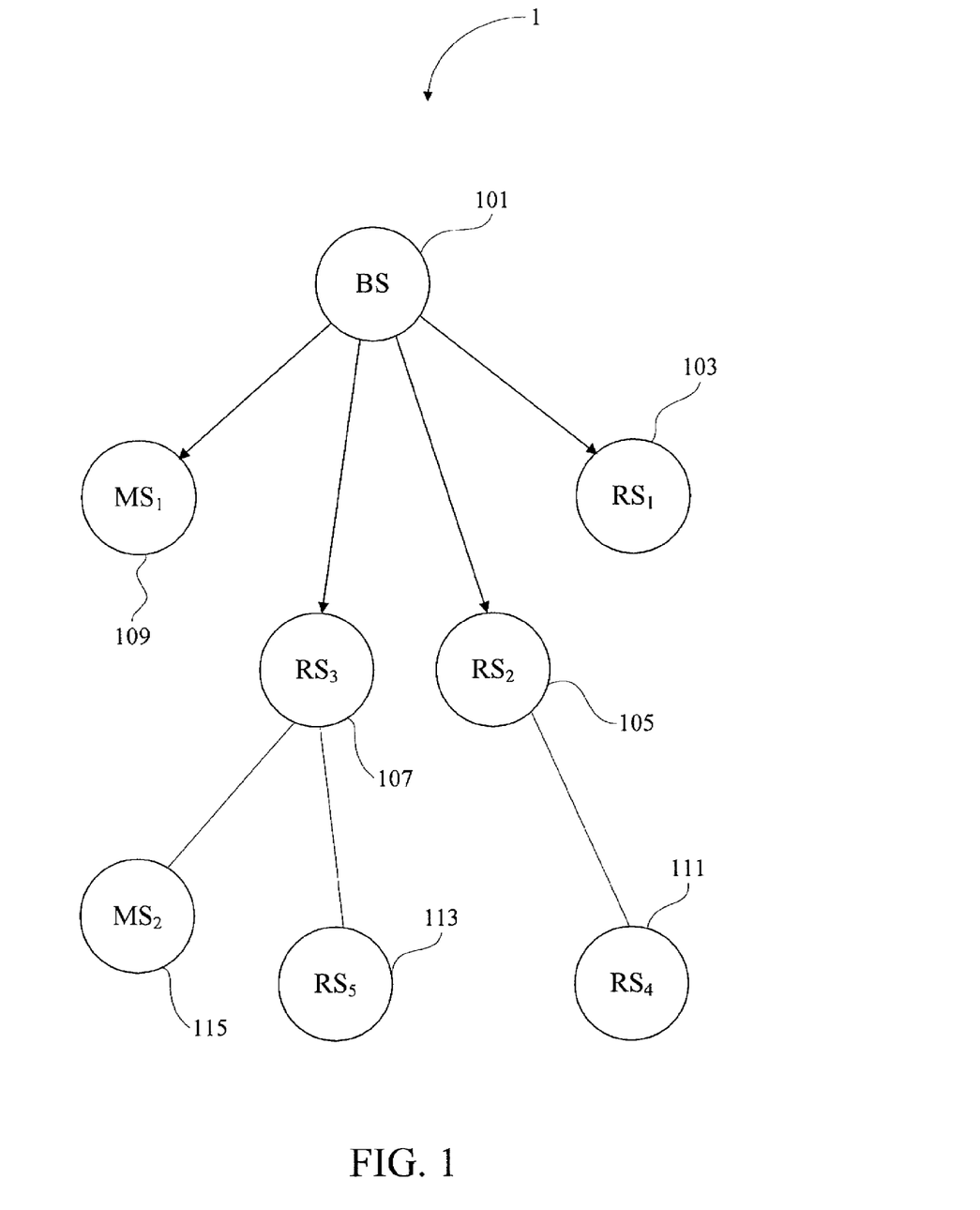
FIG. 1 illustrates a block diagram of a first embodiment of the present invention.
Figure 2:
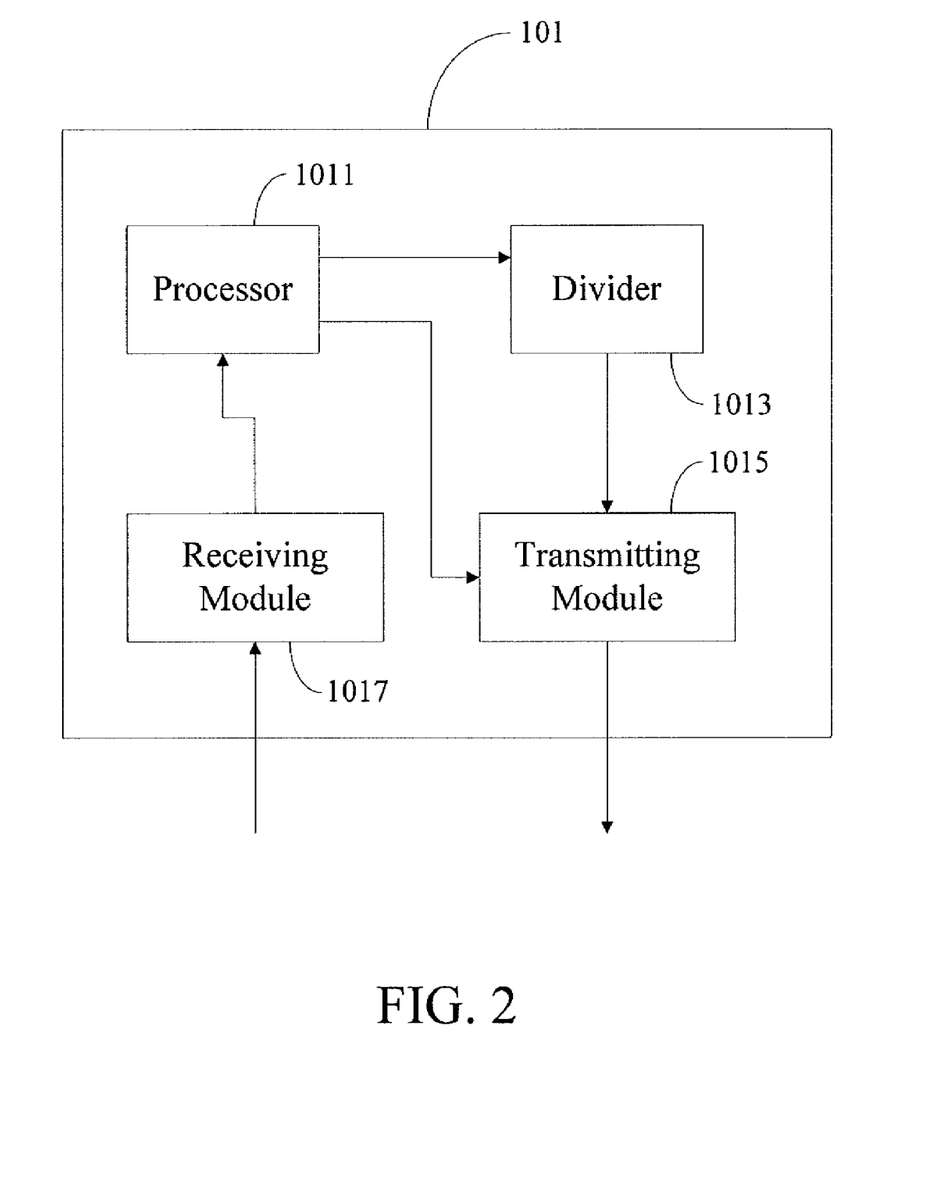
FIG. 2 illustrates a block diagram of a BS of the first embodiment.
Figure 3:
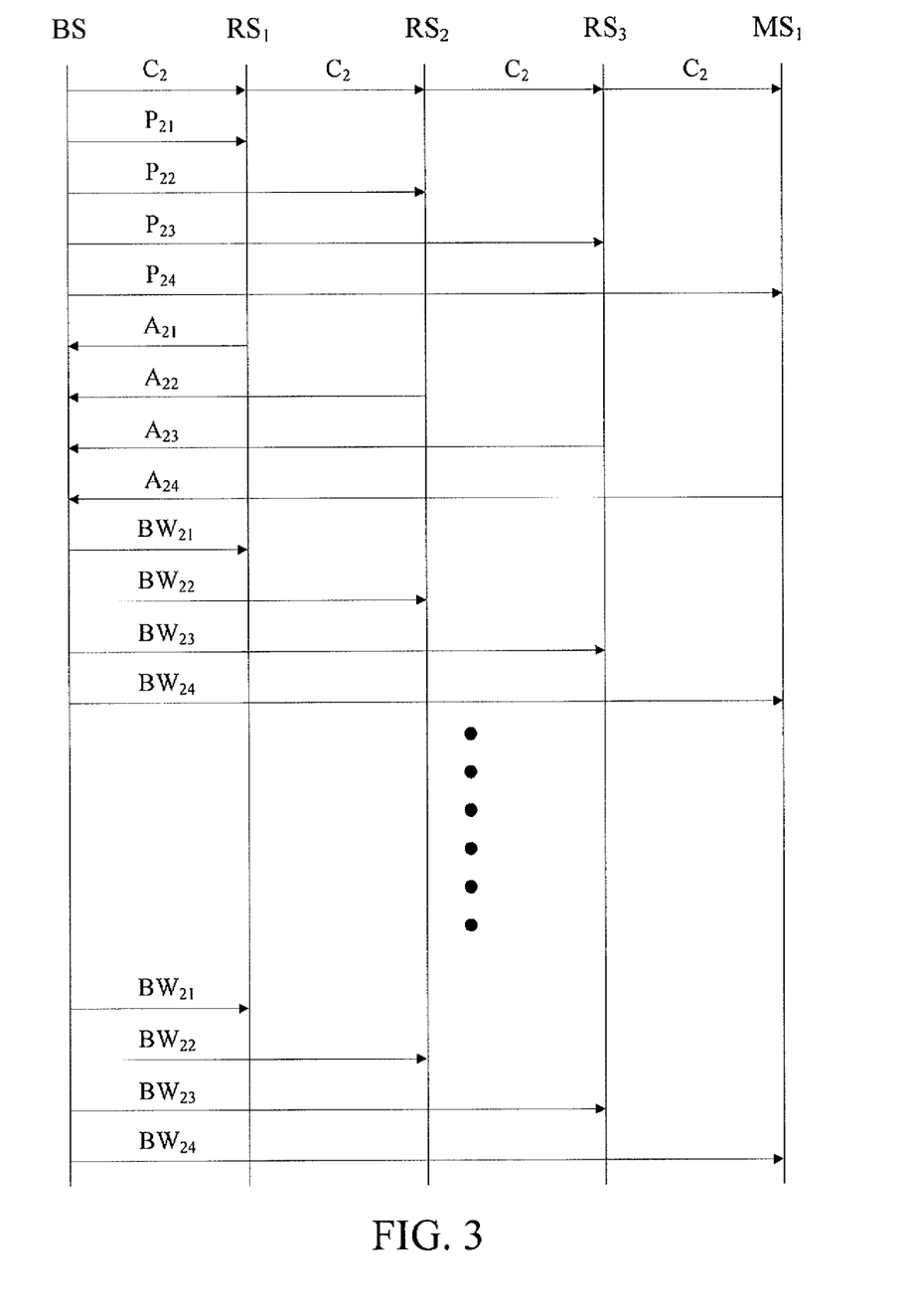
FIG. 3~FIG. 5 are diagrams of transmitting common channel descriptor, particular channel descriptors, Acks, and BW allocations of the first embodiment.
Figure 4:
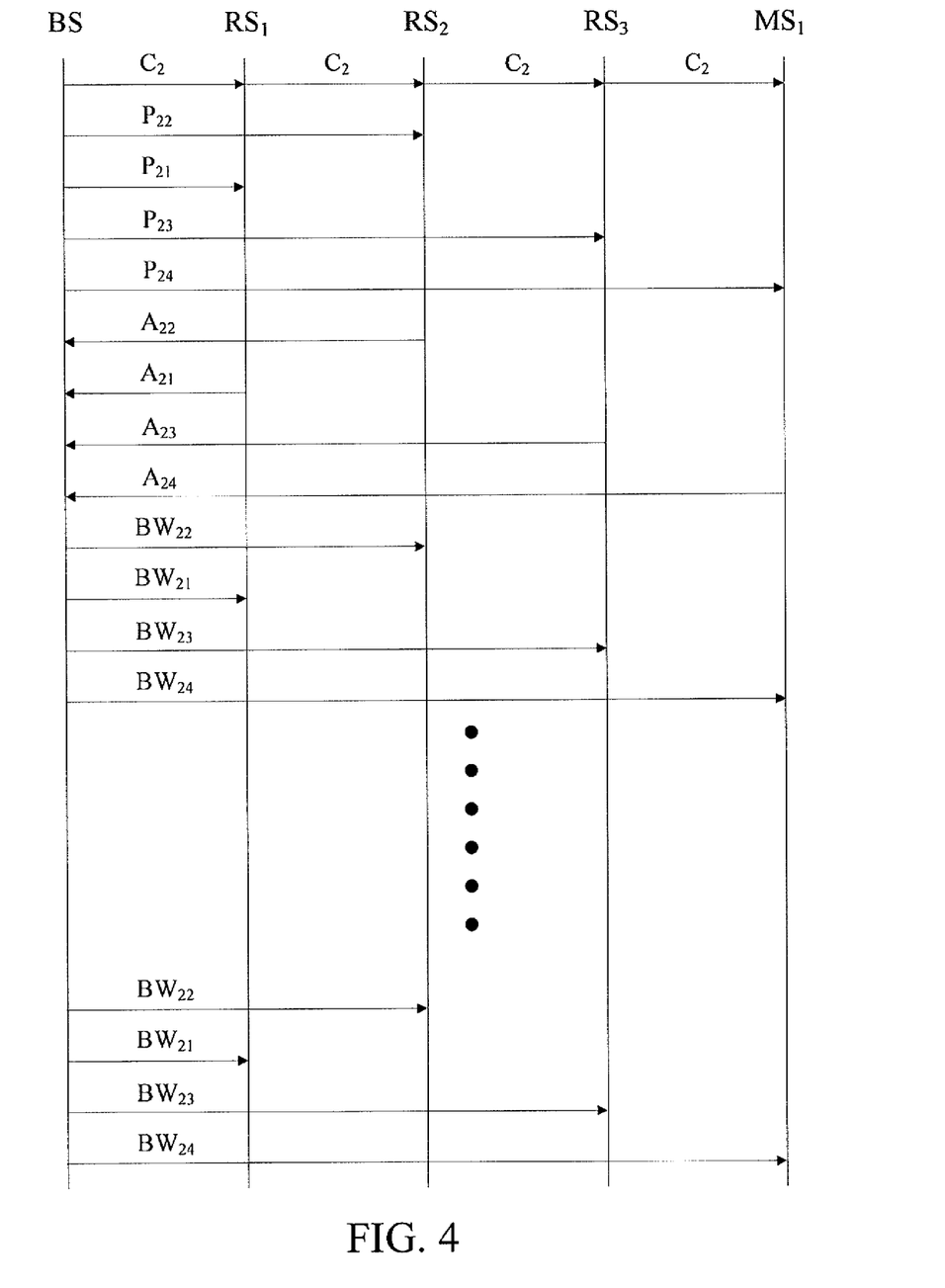
Figure 5:
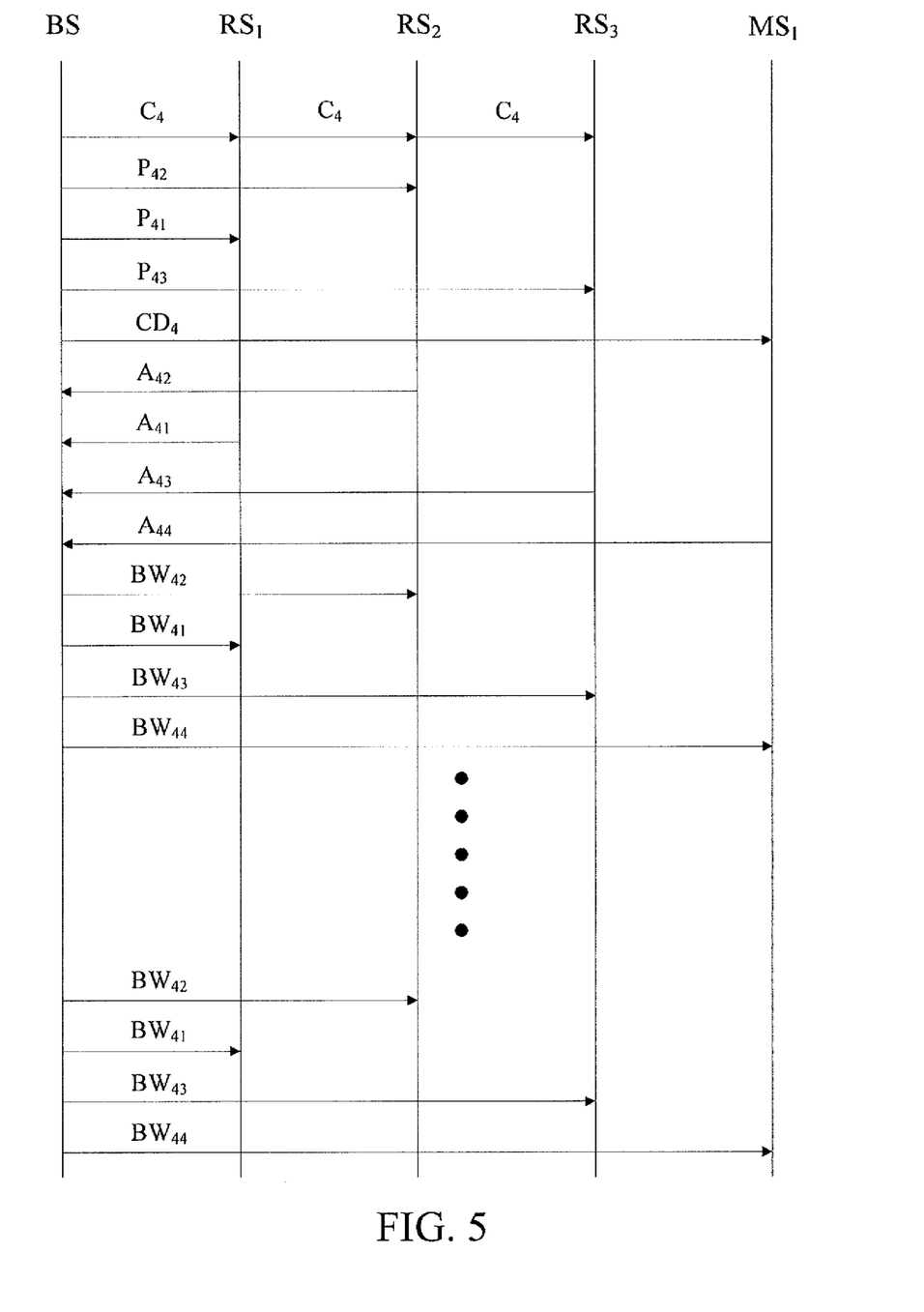

As illustrated in FIG. 1, a first embodiment of the present invention is a multi-hop relay station system 1 based on a multi-hop relay standard, such as IEEE 802.16j standard. The multi-hop relay station system 1 comprises a BS 101, a plurality of RSs 103, 105, 107, 111, 113, and MSs 109, 115. For the sake of simplification, three RSs ($RS_1$ 103, $RS_2$ 105, $RS_3$ 107, $RS_4$ 111, and $RS_5$ 113) are illustrated. The BS 101 of the multi-hop relay station system 1 is illustrated in FIG. 2, which comprises a processor 1011, a divider 1013, a transmitting module 1015, and a receiving module 1017. And some types of the transmitting of channel descriptors and BW allocations of the multi-hop relay station system 1 are illustrated in FIG. 3 to FIG. 5. The channel descriptors can be DCDs, UCDs, or combinations of the DCDs and the UCDs. In FIG. 3 and FIG.

4, the processor 1011 of the BS 101 finds the same information of the channel descriptors of the $RS_1$ 103, the $RS_2$ 105, the $RS_3$ 107, and the $MS_1$ 109 first. The channel descriptor of the $RS_1$ 103 is divided into a common channel descriptor $C_2$ and a particular channel descriptor $P_{21}$ of the $RS_1$ by the divider 1013 of the BS 101 according to the same information. The channel descriptor of the $RS_2$ 105 is divided into a common channel descriptor $C_2$ and a particular channel descriptor $P_{22}$ of the $RS_2$ 105 by the divider 1013 of the BS 101 according to the same information. The channel descriptor of the $RS_3$ 107 is divided into a common channel descriptor $C_2$ and a particular channel descriptor $P_{23}$ of the $RS_3$ 107 by the divider 1013 of the BS 101 according to the same information. The channel descriptor of the $MS_1$ 109 is divided into a common channel descriptor $C_2$ and a particular channel descriptor $P_{24}$ of the $MS_1$ 109 by the divider 1013 of the BS 101 according to the same information.

The common channel descriptors $C_2$ of the $RS_1$ 103, the $RS_2$ 105, the $RS_3$ 107, and the $MS_1$ 109 are the same, so that the transmitting module 1015 of the BS 101 can transmit (i.e. broadcast/multicast) the common channel descriptor only once to save the radio source. After that, the particular channel descriptor $P_{21}$ of the $RS_1$ 103 will be transmitted to the $RS_1$ 103, the particular channel descriptor $P_{22}$ of the $RS_2$ 105 will be transmitted to the $RS_2$ 105, the particular channel descriptor $P_{23}$ of the $RS_3$ 107 will be transmitted to the $RS_3$ 107, and the particular channel descriptor $P_{24}$ of the $MS_1$ 109 will be transmitted to the $MS_1$ 109 by the transmitting module 1015 of the BS 101. And the sequence of separately transmitting the particular channel descriptors ($P_{21}$, $P_{22}$, $P_{23}$, and $P_{24}$) of the RSs and MS is variable. In other words, the particular channel descriptor $P_{23}$ of the $RS_3$ 107 can be transmitted before the particular channel descriptor $P_{24}$ of the $MS_1$ 109 or the particular channel descriptor $P_{24}$ of the $MS_1$ 109 can be transmitted before the particular channel descriptor $P_{21}$ of the $RS_1$ 103, etc.

After the $RS_1$ 103, $RS_2$ 105, $RS_3$ 107, and $MS_1$ 109 receive the particular channel descriptor $P_{21}$, $P_{22}$, $P_{23}$, $P_{24}$, respectively, the $RS_1$ 103 transmits an Ack $A_{21}$ to the BS 101 for replying the particular channel descriptor $P_{21}$, the $RS_2$ 105 transmits an Ack $A_{22}$ to the BS 101 for replying the particular channel descriptor $P_{22}$, the $RS_3$ 107 transmits an Ack $A_{23}$ to the BS 101 for replying the particular channel descriptor $P_{23}$, and the $MS_1$ 109 transmits an Ack $A_{24}$ to the BS 101 for replying the particular channel descriptor $P_{24}$. Similarly, the sequence of separately transmitting the Ack ($A_{21}$, $A_{22}$, $A_{23}$, and $A_{24}$) of the RSs and MS is variable. In other words, the Ack $A_{23}$ of the $RS_3$ 107 can be transmitted before the Ack $A_{24}$ of the $MS_1$ 109 or the Ack $A_{24}$ of the $MS_1$ 109 can be transmitted before the Ack $A_{21}$ of the $RS_1$ 103, etc.

When the receiving module 1017 of the BS 101 receives the Acks ($A_{21}$, $A_{22}$, $A_{23}$, and $A_{24}$) from the RSs 103, 105, 107, and $MS_1$ 109, the processor 1011 of the BS 101 will configure BW allocations of the RSs 103, 105, 107, and $MS_1$ 109. After that, the transmitting module 1015 of the BS 101 can transmit a BW allocation $BW_{21}$ to the $RS_1$ 103, a BW allocation $BW_{22}$ to the $RS_2$ 105, a BW allocation $BW_{23}$ to the $RS_3$ 107, and a BW allocation $BW_{24}$ to the $MS_1$ 109 in a predetermined interval. For example, the transmitting module 1015 of the BS 101 will transmit the BW allocations ($BW_{21}$, $BW_{22}$, $BW_{23}$, and $BW_{24}$) every 25 ms or other intervals. And the sequence of separately transmitting the BW allocations ($BW_{21}$, $BW_{22}$, $BW_{23}$, and $BW_{24}$) of the RSs and MS is also variable.

Finally, when receiving the BW allocations $BW_{22}$ and $BW_{23}$, respectively, the RSs 105 and 107 can transmit (i.e. broadcast/multicast) channel descriptors to the RSs 111, 113, and $MS_2$ 115 according to the BW allocations $BW_{22}$ and $BW_{23}$. More specifically, the $RS_2$ 105 combines the common channel descriptor $C_2$ and the particular channel descriptor $P_{22}$ to generate the channel descriptor of the $RS_2$ 105, and the $RS_2$ 105 relays the combined channel descriptor to the $RS_4$ 111 according to the BW allocation $BW_{22}$. Similarly, the $RS_3$ 107 combines the common channel descriptor $C_2$ and the particular channel descriptor $P_{23}$ to generate the channel descriptor of the $RS_3$ 107, and the $RS_3$ 107 relays the combined channel descriptor to the $RS_5$ 113 and the $MS_2$ 115 according to the BW allocation $BW_{23}$.

In FIG. 5, the processor 1011 of the BS 101 finds the same information of the channel descriptors of the $RS_1$ 103, the $RS_2$ 105, the $RS_3$ 107, and the $MS_1$ 109 first. If no same information exists among the channel descriptors of the $RS_1$ 103, the $RS_2$ 105, the $RS_3$ 107, and the $MS_1$ 109, the processor 1011 of the BS 101 will find the greatest amount of the same information among parts of the RSs 103, 105, 107, 109. In this example, there exists same information among the channel descriptors of the $RS_1$ 103, the $RS_2$ 105, and the $RS_3$ 107. Consequently, the channel descriptor of the $RS_1$ 103 is divided into a common channel descriptor $C_4$ and a particular channel descriptor $P_{41}$ of the $RS_1$ 103 by the divider 1013 of the BS 101 according to the same information. The channel descriptor of the $RS_2$ 105 is divided into a common channel descriptor $C_4$ and a particular channel descriptor $P_{42}$ of the $RS_2$ 105 by the divider 1013 of the BS 101 according to the same information. The channel descriptor of the $RS_3$ 107 is divided into a common channel descriptor $C_4$ and a particular channel descriptor $P_{43}$ of the $RS_3$ 107 by the divider 1013 of the BS 101 according to the same information. And in this example, a channel descriptor $CD_4$ of the $MS_1$ 109 is not divided.

The common channel descriptors of the $RS_1$ 103, the $RS_2$ 105, and the $RS_3$ 107 are the same, so that the transmitting module 1015 of the BS 101 can broadcast/multicast the common channel descriptor $C_4$ only once to save the radio source. After that, the particular channel descriptor $P_{41}$ of the $RS_1$ 103 will be transmitted to the $RS_1$ 103, the particular channel descriptor $P_{42}$ of the $RS_2$ 105 will be transmitted to the $RS_2$ 105, and the particular channel descriptor $P_{43}$ of the $RS_3$ 107 will be transmitted to the $RS_3$ 107 by the transmitting module 1015 of the BS 101. And the sequence of separately transmitting the particular channel descriptors ($P_{41}$, $P_{42}$, and $P_{43}$) of the $RS_1$ 103, the $RS_2$ 105, and the $RS_3$ 107, respectively, is variable. Finally, the channel descriptor $CD_4$ of the $MS_1$ 109 is transmitted to the $MS_1$ 109 by the transmitting module 1015 of the BS 101 directly.

After the $RS_1$ 103, $RS_2$ 105, $RS_3$ 107, and $MS_1$ 109 receive the particular channel descriptor $P_{41}$, $P_{42}$, $P_{43}$, and the channel descriptor $CD_4$, respectively, the $RS_1$ 103 transmits an Ack $A_{41}$ to the BS 101 for replying the particular channel descriptor $P_{41}$, the $RS_2$ 105 transmits an Ack $A_{42}$ to the BS 101 for replying the particular channel descriptor $P_{42}$, the $RS_3$ 107 transmits an Ack $A_{43}$ to the BS 101 for replying the particular channel descriptor $P_{43}$, and the $MS_1$ 109 transmits an Ack $A_{44}$ to the BS 101 for replying the channel descriptor $CD_4$. Similarly, the sequence of separately transmitting the Ack ($A_{41}$, $A_{42}$, $A_{43}$, and $A_{44}$) of the RSs and MS is variable. In other words, the Ack $A_{43}$ of the $RS_3$ 107 can be transmitted before the Ack $A_{44}$ of the $MS_1$ 109 or the Ack $A_{44}$ of the $MS_1$ 109 can be transmitted before the Ack $A_{41}$ of the $RS_1$ 103, etc.

When the receiving module 1017 of the BS 101 receives the Acks ($A_{41}$, $A_{42}$, $A_{43}$, and $A_{44}$) from the RSs 103, 105, 107, and $MS_1$ 109, the processor 1011 of the BS 101 will configure BW allocations of the RSs 103, 105, 107, and $MS_1$ 109. After that, the transmitting module 1015 of the BS 101 can transmit a BW allocation $BW_{41}$ to the $RS_1$ 103, a BW allocation $BW_{42}$ to the $RS_2$ 105, a BW allocation $BW_{43}$ to the $RS_3$ 107, and a BW allocation $BW_{44}$ to the $MS_1$ 109 in a predetermined interval. For example, the transmitting module 1015 of the BS 101 will transmit the BW allocations ($BW_{41}$, $BW_{42}$, $BW_{43}$, and $BW_{44}$) every 25 ms or other intervals. And the sequence of separately transmitting the BW allocations ($BW_{41}$, $BW_{42}$, $BW_{43}$, and $BW_{44}$) of the RSs and MS is also variable.

Finally, when receiving the BW allocations $BW_{42}$ and $BW_{43}$, respectively, the RSs 105 and 107 can transmit (i.e. broadcast/multicast) channel descriptors to the RSs 111, 113, and $MS_2$ 115 according to the BW allocations $BW_{42}$ and $BW_{43}$. More specifically, the $RS_2$ 105 combines the common channel descriptor $C_4$ and the particular channel descriptor $P_{42}$ to generate the channel descriptor of the $RS_2$ 105, and the $RS_2$ 105 relays the combined channel descriptor to the $RS_4$ 111 according to the BW allocation $BW_{42}$. Similarly, the $RS_3$ 107 combines the common channel descriptor $C_4$ and the particular channel descriptor $P_{43}$ to generate the channel descriptor of the $RS_3$ 107, and the $RS_3$ 107 relays the combined channel descriptor to the $RS_5$ 113 and the $MS_2$ 115 according to the BW allocation $BW_{43}$.

Figure 6:
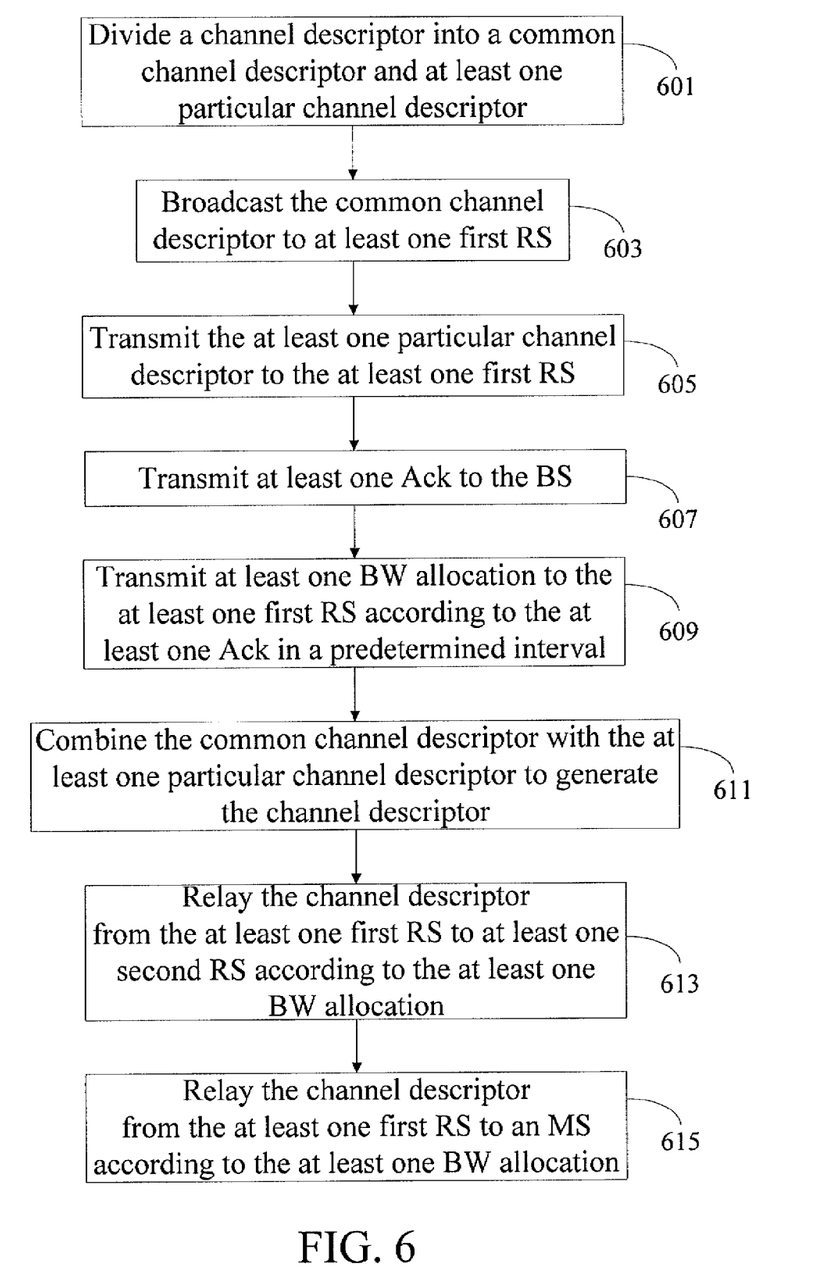
FIG. 6 is a flow chart illustrating a second embodiment of the present invention.

A second embodiment of this invention is another method for transmitting at least one bandwidth (BW) allocation according to at least one particular channel descriptor divided from a channel descriptor based on a multi-hop relay standard, which is a method applied to the multi-hop relay wireless communication system 1 described in the first embodiment. More specifically, the method of the second embodiment which is illustrated in FIG. 6 can be implemented by an application program controlling various modules of a wireless communication apparatus in the multi-hop relay wireless communication system 1. This application program may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In step 601, a channel descriptor is divided into a common channel descriptor and at least one particular channel descriptor by a BS in the multi-hop relay wireless communication system 1, such as the BS 101. Next in step 603, the common channel descriptor is broadcasted/multicasted from the BS 101 to at least one first RS in the multi-hop relay wireless communication system 1, such as the $RS_3$ 107. In step 605, the at least one particular channel descriptor is transmitted from the BS to the at least one first RS. In step 607, at least one Ack is transmitted from the at least one first RS to the BS. Then, in step 609, at least one BW allocation is transmitted from the BS to the at least one first RS according to the at least one Ack in a predetermined interval. In step 611, the common channel descriptor is combined with the at least one particular channel descriptor to generate the channel descriptor. In the step 613, the channel descriptor is relayed from the at least one first RS to at least one second RS according to the at least one BW allocation in the multi-hop relay wireless communication system 1, such as the $RS_5$ 113. Finally, in step 615, according to the at least one BW allocation, the channel descriptor is relayed from the at least one first RS to an MS, such as the $MS_2$ 115.

In addition to the steps revealed in FIG. 6, the second embodiment can also execute all the operations of the first embodiment, in which those skilled in the art can understand the corresponding steps and operations of the second embodiment by referring to the explanation of the first embodiment, and thus similar description is unnecessary.

Accordingly, by dividing a channel descriptor into a common channel descriptor and at least one particular channel descriptor, transmitting, such as broadcasting or multicasting, the common channel descriptor to a plurality of RSs, and transmitting the at least one particular channel descriptor to one of the RSs. And by receiving Acks from each RS which has received one of the particular channel descriptors, this invention can transmit BW allocations to each RS of the wireless communication system based on a multi-hop relay standard for channel descriptor transmission.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for transmitting at least one bandwidth (BW) allocation according to at least one particular channel descriptor divided from a channel descriptor based on a multi-hop relay standard, comprising the steps of:

dividing the channel descriptor into a common channel descriptor and the at least one particular channel descriptor;

transmitting the at least one particular channel descriptor from a base station (BS) to at least one first relay station (RS);

transmitting at least one acknowledgement character (Ack) from the at least one first RS to the BS for replying the at least one particular channel descriptor; and transmitting the at least one BW allocation from the BS to the at least one first RS according to the at least one Ack in a predetermined interval.

2. The method as claimed in claim 1, further comprising the steps of:

combining the common channel descriptor with the at least one particular channel descriptor to generate the channel descriptor; and relaying the channel descriptor from the at least one first RS to at least one mobile station (MS) according to the at least one BW allocation.

3. The method as claimed in claim 1, further comprising the steps of:

combining the common channel descriptor with the at least one particular channel descriptor to generate the channel descriptor; and relaying the channel descriptor from the at least one first RS to at least one second RS according to the at least one BW allocation.

4. The method as claimed in claim 1, further comprising the steps of:

transmitting the at least one particular channel descriptor from the BS to at least one MS;

transmitting the at least one Ack from the at least one MS to the BS for replying the at least one particular channel descriptor; and transmitting the at least one BW allocation from the BS to the at least one MS according to the at least one Ack in a predetermined interval.

5. A wireless communication system for transmitting at least one BW allocation according to at least one particular channel descriptor divided from a channel descriptor based on a multi-hop relay standard, comprising:
- at least one first RS; and
- a BS for dividing the channel descriptor into a common channel descriptor and the at least one particular channel descriptor and transmitting the at least one particular channel descriptor to the at least one first RS;
- wherein the at least one first RS transmits at least one Ack to the BS for replying the at least one particular channel descriptor, and the BS transmits the at least one BW allocation to the at least one first RS according to the at least one Ack in a predetermined interval.

6. The wireless communication system as claimed in claim 5, further comprising:
- at least one MS;
- wherein the least one first RS combines the common channel descriptor with the at least one particular channel descriptor to generate the channel descriptor, and relays the channel descriptor to the at least one MS according to the at least one BW allocation.

7. The wireless communication system as claimed in claim 5, further comprising:
- at least one second RS;
- wherein the least one first RS combines the common channel descriptor with the at least one particular channel descriptor to generate the channel descriptor, and relays the channel descriptor to the at least one second RS according to the at least one BW allocation.

8. The wireless communication system as claimed in claim 5, further comprising:
- at least one MS;
- wherein the BS transmits the at least one particular channel descriptor to the at least one MS, the at least one MS transmits the at least one Ack to the BS for replying the at least one particular channel descriptor, and the BS transmits the at least one BW allocation to the at least one MS according to the at least one Ack in a predetermined interval.

9. The wireless communication system as claimed in claim 5, wherein the multi-hop relay standard is IEEE 802.16j standard.

10. A tangible machine-readable medium having executable code to cause a machine to perform a method for transmitting at least one BW allocation according to at least one particular channel descriptor divided from a channel descriptor based on a multi-hop relay standard, the method comprising steps of:
- dividing the channel descriptor into a common channel descriptor and the at least one particular channel descriptor;
- transmitting the at least one particular channel descriptor from a BS to at least one first RS;
- transmitting at least one Ack from the at least one first RS to the BS for replying the at least one particular channel descriptor; and
- transmitting the at least one BW allocation from the BS to the at least one first RS according to the at least one Ack in a predetermined interval.

11. The tangible machine-readable medium as claimed in claim 10, wherein the method further comprises the steps of:
- combining the common channel descriptor with the at least one particular channel descriptor to generate the channel descriptor; and
- relaying the channel descriptor from the at least one first RS to at least one MS according to the at least one BW allocation.

12. The tangible machine-readable medium as claimed in claim 10, wherein the method further comprises the steps of:
- combining the common channel descriptor with the at least one particular channel descriptor to generate the channel descriptor; and
- relaying the channel descriptor from the at least one first RS to at least one second RS according to the at least one BW allocation.

13. The tangible machine-readable medium as claimed in claim 10, wherein the method further comprises the steps of
- transmitting the at least one particular channel descriptor from the BS to at least one MS;
- transmitting the at least one Ack from the at least one MS to the BS for replying the at least one particular channel descriptor; and
- transmitting the at least one BW allocation from the BS to the at least one MS according to the at least one Ack in a predetermined interval.

14. A communication apparatus for transmitting at least one BW allocation based on a multi-hop relay standard, comprising:
- a divider for dividing the channel descriptor into a common channel descriptor and at least one particular channel descriptor;
- a transmitting module for transmitting the at least one particular channel descriptor divided from the channel descriptor to at least one RS; and
- a receiving module for receiving at least one Ack from the at least one RS for replying the at least one particular channel descriptor;
- wherein the transmitting module transmits the at least one BW allocation to the at least one RS according to the at least one Ack in a predetermined interval.

* * * * *